Sept. 21, 1965  W. R. POLANIN ETAL  3,207,271
BRAKE WITH VARIABLE RATIO LEVERS
Filed Jan. 24, 1964  2 Sheets-Sheet 2
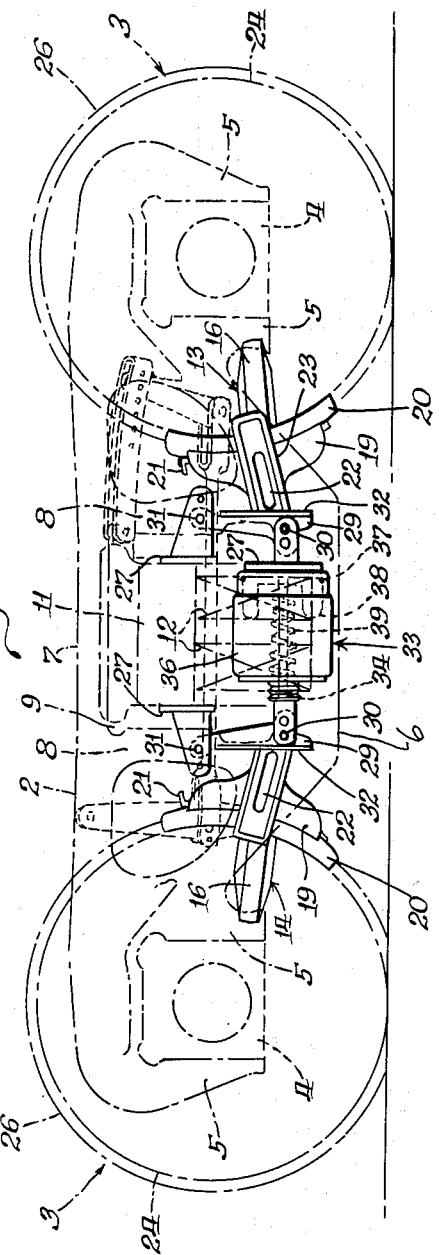
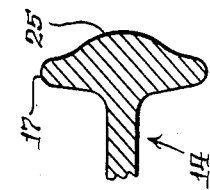
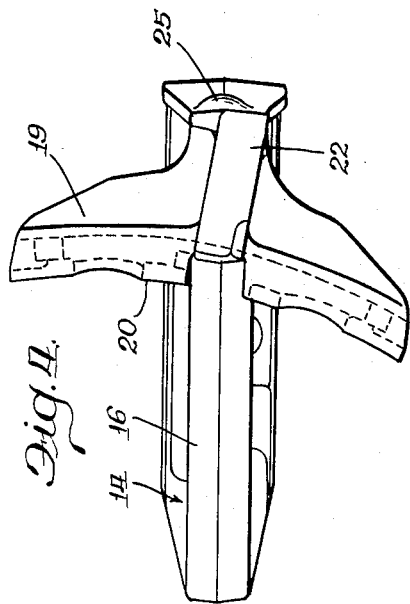
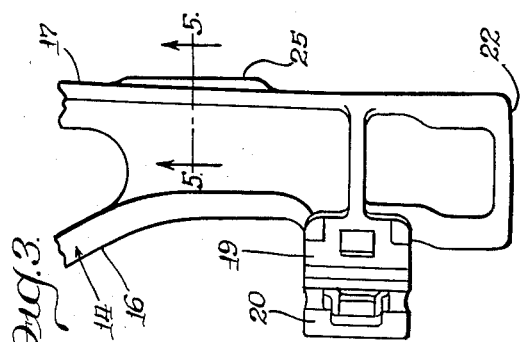
INVENTORS.
Walter R. Polanin
Edward J. Simanek
By: Walter P. Schlegel Jr.
Atty.
Witness:
Bassett ated Sept. 21, 1965

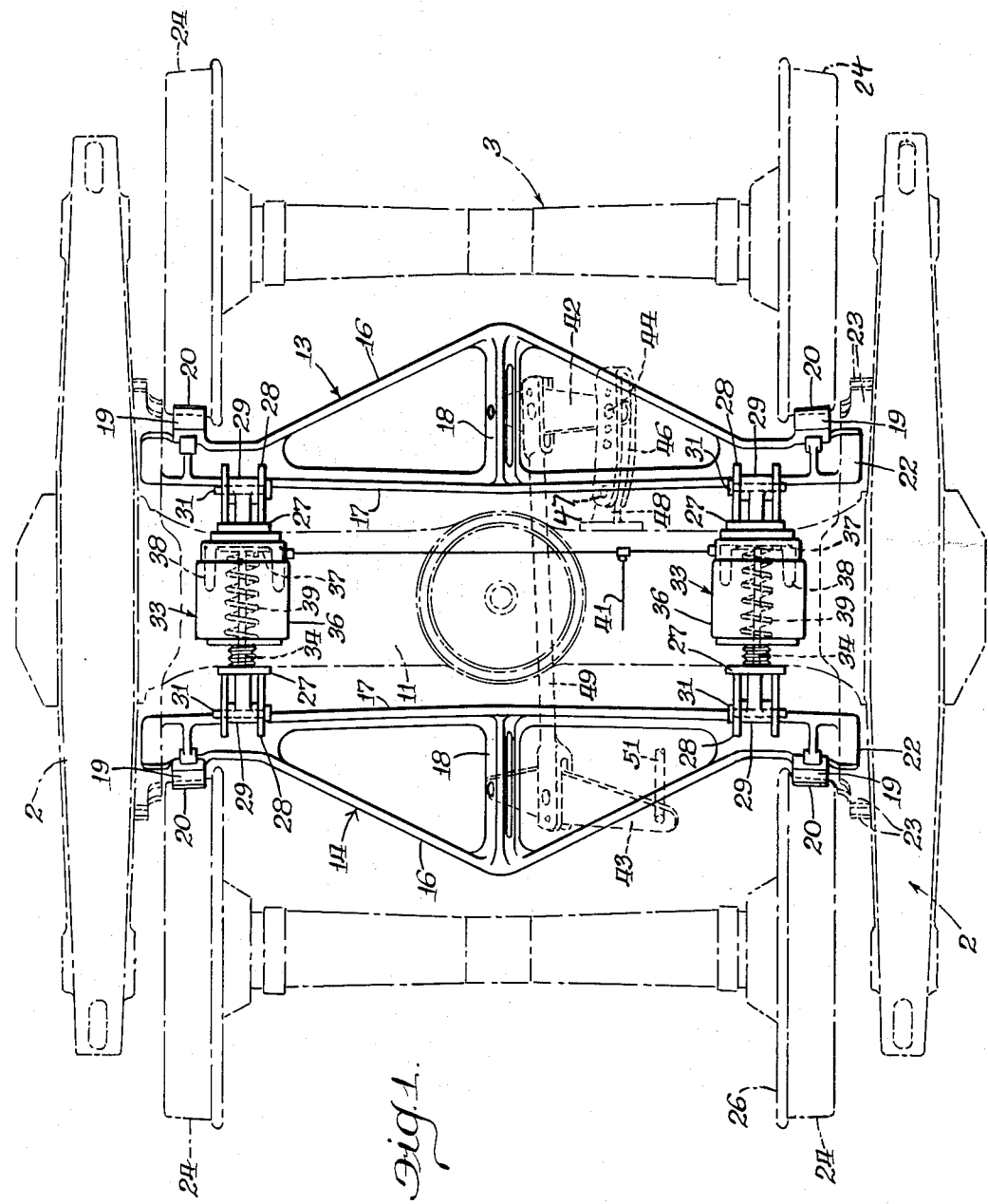

United States Patent Office 3,207,271
Patented Sept. 21, 1965

3,207,271
BRAKE WITH VARIABLE RATIO LEVERS
Walter R. Polanin, Hazel Crest, and Edward J. Simanek, Homewood, Ill., assignors to Amsted Industries Incorporated, Chicago, Ill., a corporation of New Jersey
Filed Jan. 24, 1964, Ser. No. 340,004
5 Claims. (Cl. 188—195)

This is a continuation-in-part of application Serial No. 149,940, Filed Nov. 3, 1961.

This invention relates to brake rigging for railway freight car trucks and more particularly to a tread brake rigging adapted to apply a variable braking force in accordance with variations in the weight of goods being transported on the freight car.

Heretofore, it has been the practice to design brake rigging adapted to exert a predetermined maximum braking force against the brake shoes to gradually decelerate wheel and axle assemblies without causing slippage and resultant flat spots on the wheels. The present invention contemplates the provision of a brake rigging adapted to apply a predetermined braking force to the brake shoes when the freight car is unloaded, and adapted to apply a relatively greater braking force to the brake shoes when the freight car is loaded.

The invention further contemplates the provision of a brake rigging in which the mechanical advantage of the brake levers gradually increases responsive to deflection of the bolster relative to the side frames of a conventional freight car truck.

The invention further contemplates the provision of a tread brake rigging which is relatively simple and inexpensive in construction and reliable in operation.

The invention embodies other novel features, details of construction and arrangement of parts which are hereinafter set forth in the specification and calims and illustrated in the accompanying drawings, forming part thereof, wherein:

FIGURE 1 is a top plan view illustrating a conventional four wheel railway car truck provided with a tread brake arrangement embodying features of the invention;

FIGURE 2 is a side elevation of the structure shown in FIGURE 1;

FIGURE 3 is a fragmentary detailed plan view showing one end of a brake beam;

FIGURE 4 is an end elevation of the brake beam shown in FIGURE 3;

FIGURE 5 is a fragmentary section taken along the line 5—5 of FIGURE 3.

Referring now to the drawings for a better understanding of the invention, the tread brake arrangement is shown as applied to a conventional four wheel freight car truck comprising side frames 2 supported at their ends on wheel and axle assemblies 3, which are journaled in boxes 4 engaged between pedestal jaws 5. Each side frame 2 comprises tension and compression members 6 and 7 interconnected by spaced vertical columns 8 to define a window 9 adapted to receive an end of a bolster 11. The bolster is resiliently supported at its ends upon spring groups 12 seated on the side frame tension members 6 between the columns 8.

Truss type brake beams 13 and 14 are arranged on opposite sides of the bolster 11 adjacent their respective wheel and axle assemblies 3, each beam being shown as comprising a one-piece metal casting having tension and compression members 16 and 17 interconnected by a strut 18. The tension and compression members converge toward the ends of the beam to merge with brake heads 19 having brake shoes 20 detachably mounted thereon by means of keys 21. Guide lugs 22 are formed on the ends of each beam for sliding engagement between guide members 23 provided on the side frames, the beams being guided for radial movement upwardly toward the longitudinal axis of the respective wheel and axle assemblies during braking engagement of the brake shoes 20 against the tread surfaces 24 of their respective wheels 26.

Brake lever support brackets 27 are secured to opposite sides of the bolster 11 adjacent each of the ends thereof, each bracket having spaced arms 28 to receive the upper end of a brake lever 29 therebetween. Each brake lever is pivotally supported on the arms 28 by means of a pivot pin 31, and is provided with a flat hardened wearplate 32 for sliding abutting engagement against a convex boss 25 formed on the compression member 17 of its respective brake beam inboardly from and adjacent the brake head 19.

To reduce friction and to provide a long useful life, the wearplate 32 is heat treated to provide a Brinell surface hardness of from 241 to 262; and each convex boss 25 on the brake beams is flame hardened to a minimum hardness of 400 Brinell to a minimum depth of $\frac{1}{16}$ of an inch. The hardened bosses 25 on each beam are in longitudinal alignment for flush engagement against the hardened wearplates 32 provided on the brake levers 29.

A power unit 33 is pivotally connected at its ends to the lower ends of each pair of brake levers 29 by means of pivot pins 30 spaced downwardly from their respective brake beams. Each power unit is preferably of the type manufactured and sold by Bendix-Westinghouse Automotive Air Brake Company under the trademark "Rotochamber" and is shown as comprising a piston rod 34 mounted in a cylinder 36. A plate 37 is secured on the inner end of the piston rod for engagement with the inner periphery of a flexible diaphragm 38 which has its outer periphery secured to the cylinder. A helical compression spring 39 is interposed between the plate 37 and the front wall of the cylinder to bias the piston rod 34 toward the back wall of the cylinder. The back wall of the cylinder 36 is pivotally connected to one brake lever 29, while the outer end of the piston rod 34 is pivotally connected to the companion brake lever, as shown in FIGURE 2. The two power cylinders are adapted to be connected to a suitable source of pressurized air by means of a common conduit 41.

For manual operation of the brake rigging, levers 42 and 43 are pivotally connected at their lower ends to their respective brake beam struts 18. The upper end of the lever 42 is pivotally connected at 44 to a fulcrum member 46 which is pivotally connected at 47 to a bracket 48 secured on the bolster 11. The levers 42 and 43 are interconnected intermediate their ends by a link 49 which passes through an opening in the bolster. The upper end of the lever 43 is adapted to be connected by a rod 51 to any conventional manually operable brake applying mechanism.

In the operation of the brake rigging thus shown and described, pressurized air is supplied to the power cylinders 36 through the conduit 41 to cause the cylinders and their respective piston rods 34 to move in opposite directions and thereby pivot the brake levers 29 toward their respective wheel and axle assemblies 3. The flat front faces on the hardened wearplates 32 on the brake levers act against their respective hardened convex bosses 25 on the brake beams 13 and 14 to move the brake shoes 20 into engagement against the tread surfaces 24 of the wheels 26. Upon discharge of the air from the power cylinders, the springs 39 act to move the piston rods 34 toward the back walls of the cylinders and thereby pivot the brake levers 29 toward each other and thereby permit the brake beams to move by gravity away from their respective wheel and axle assemblies.

It will be noted that the brake rigging is adapted to apply a variable braking force to decelerate the wheel and axle assemblies, the force exerted being dependent upon the load supported upon the bolster. As the load applied on the bolster increases, it will be noted that the distance between the pivot pins 31 and the point of contact between the wearplates 32 and bosses 25 decreases whereby the brake levers act to apply a greater braking force to decelerate the wheel and axle assemblies.

We claim:

1. In a tread brake rigging for a self-aligning spring plankless railway freight car truck having side frames supported at their ends upon wheel and axle assemblies, and a bolster resiliently supported at its ends for vertical movement upon spring groups seated on the side fames, two brake beams arranged on opposite sides of the bolster and slidably supported at their ends upon the side frames for movement toward and away from their respective wheel and axle assemblies, two convex bosses on each brake beam adjacent the ends thereof, brake shoes on opposite ends of said beams to frictionally engage the tread surfaces of their respective wheels, two brake levers pivotally suspended from each side of the bolster and having flat wearplates thereon for sliding abutting engagement against their respective brake beam bosses, power means to pivot said brake levers to move said brake beams toward their respective wheel and axle assemblies to frictionally engage the brake shoes against the wheel tread surfaces.

2. In a tread brake rigging for a self-aligning spring plankless railway freight car truck having side frames supported at their ends upon wheel and axle assemblies, and a bolster resiliently supported at its ends for vertical movement upon spring groups seated on the side fames, two brake beams arranged on opposite sides of the bolster and slidably supported at their ends upon the side frames for movement toward and away from their respective wheel and axle assemblies, two convex bosses on each brake beam adjacent the ends thereof, brake shoes on opposite ends of said beams to frictionally engage the tread surfaces of their respective wheels, two brake levers pivotally suspended from each side of the bolster and having flat wearplates thereon for sliding abutting engagement against their respective brake beam bosses, power means to pivot said brake levers to move said brake beams toward their respective wheel and axle assemblies to frictionally engage the brake shoes against the wheel tread surfaces, said power means comprising power cylinders connected to the lower ends of said levers, and said brake levers acting to apply a progressively increasing braking force against said brake beams responsive to downward movement of the bolster relative to the side frames.

3. In a tread brake rigging for a self-aligning spring plankless railway freight car truck having side frames supported at their ends upon wheel and axle assemblies, and a bolster resiliently supported at its ends for vertical movement upon spring groups seated on the side fames, two brake beams arranged on opposite sides of the bolster and slidably supported at their ends upon the side frames for movement toward and away from their respective wheel and axle assemblies, two convex bosses on each brake beam adjacent the ends thereof, brake shoes on opposite ends of said beams to frictionally engage the tread surfaces of their respective wheels, two brake levers pivotally suspended from each side of the bolster and having flat wearplates thereon for sliding abutting engagement against their respective brake beam bosses, power means to pivot said brake levers to move said brake beams toward their respective wheel and axle assemblies to frictionally engage the brake shoes against the wheel tread surfaces, said power means comprising power cylinders connected to the lower ends of said levers, and said brake levers acting to apply a progressively increasing braking force against said brake beams responsive to downward movement of the bolster relative to the side frames, said convex brake beam bosses extending longitudinally of the brake beams for line engagement against their respective wearplates.

4. A tread brake rigging according to claim 3 in which said convex beam bosses are flame hardened to a minimum of 400 Brinell.

5. A tread brake arrangement according to claim 4 in which the wearplates are heat treated to a surface hardness of from 241 to 262 Brinell.

References Cited by the Examiner

UNITED STATES PATENTS

| | | | |
|---|---|---|---|
| 2,885,034 | 5/59 | Holin | 188—195 |
| 2,958,398 | 11/60 | Newell | 188—153 X |

ARTHUR L. LA POINT, *Primary Examiner.*

DUANE A. REGER, *Examiner.*